United States Patent Office 3,642,840
Patented Feb. 15, 1972

3,642,840
PROCESS FOR THE CONVERSION OF 3-ENOL ETHERS OF 3-KETO-Δ⁴-STEROIDS UNSUBSTITUTED AT C₄ AND C₆ TO THE CORRESPONDING 3-KETO-Δ⁴-6-METHYLENE COMPOUNDS
Verlan H. van Rheenen, Kalamazoo, Mich., assignor to The Upjohn Company, Kalamazoo, Mich.
No Drawing. Filed Nov. 19, 1969, Ser. No. 878,218
Int. Cl. C07c 167/00
U.S. Cl. 260—397.1        20 Claims

ABSTRACT OF THE DISCLOSURE

This invention relates to novel and general processes for the conversion of the 3-enol ethers (I) of 3-keto-Δ⁴-steroids, unsubstituted at the 4 and 6 positions, of the androstane, 19-norandrostane, pregnane, 19-norpregnane, stigmastane and spirostane series into the corresponding 3-keto-Δ⁴-6β-(N,N-disubstituted) aminomethyl derivatives (II), and thence to their 6-methylene counterparts (III). The compounds of Formula III have anabolic, androgenic, anti-fertility, anti-inflammatory and estrogenic activities, and are consequently useful in treating mammals, including humans, birds and other animals in those conditions and/or ailments where such activities are desired. For example, in preventing pregnancy, increasing pelt size in female mink, treating arthritis, osteoporosis, etc. The compounds of Formula III are additionally useful as intermediates in the preparation, by known methods, of the physiologically active and therapeutically useful 6-methyl steroids, such as medroxyprogesterone acetate (6α-methyl-17α-hydroxy-4-pregnene-3,20-dione - 17 - acetate), dimethisterone [6α-methyl - 17β - hydroxy - 17α - (1-propynyl)-4-androsten-3-one], methylprednisolone (6α-methyl-11β,17α,21-trihydroxy-1,4-pregnadiene-3,20 - dione), fluoromethylone (6α-methyl-9α-fluoro-11β,17α-dihydroxy-1,4-pregnadiene-3,20-dione), etc.

BRIEF SUMMARY OF THE INVENTION

The present invention provides novel processes for the preparation of 3-keto-Δ⁴-6-methylene (III) steroids of the androstane, 19-norandrostane, pregnane, 19-norpregnane, stigmastane and spirostane series having in rings A and B of the steroid nucleus the structure

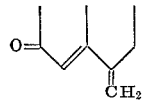

The novel processes for the production of the steroidal compounds of Formula III (and intermediates therefor) are illustratively represented by the following sequence of A and B ring formulae:

wherein R is selected from the group consisting of alkyl of from one through twelve carbon atoms, hydroxylalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms; in the compounds embraced by Formula II, R¹ and R² are selected from the group consisting of alkyl of from one through twelve carbon atoms and aryl of from six through fourteen carbon atoms; in the compounds of Formulae IV, V and VI, R¹, R² and R³ are alkyl of from one through twelve carbon atoms and X⊖ of Formulae IV and VI are selected from the group consisting of halogen and alkylsulfate.

Androstane series is defined herein as those compounds containing the carbon atoms skeleton:

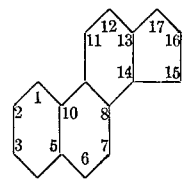

in which each of the carbon-carbon linkages can lie either single or double bonded, and which can have carbon and/or other atoms as substituents attached to the carbon atoms skeleton.

19-norandrostane series is defined herein as those compounds that differ from androstane series compounds in that the former lack the methyl group at C₁₉ attached to C₁₀ that characterizes the latter.

Pregnane series is defined herein as those compounds containing the carbon atoms skeleton:

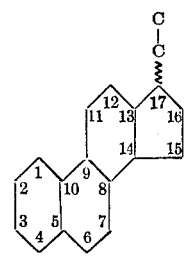

in which each of the carbon-carbon linkages can be either single or double bonded, and which can have carbon, and/or other atoms as substituents attached to the carbon atom skeleton.

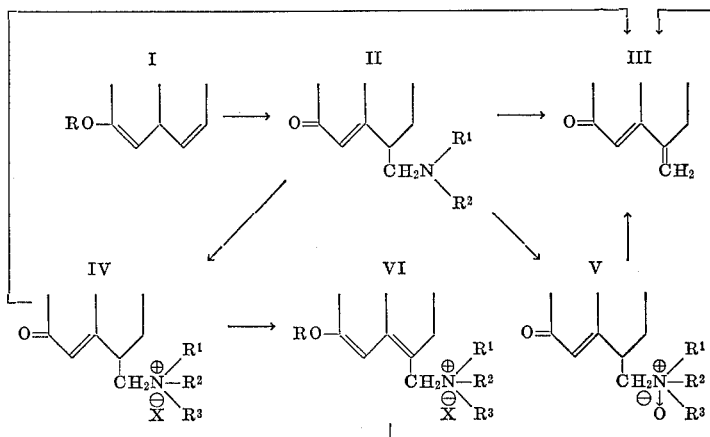

19-norpregnane series is defined herein as those compounds that differ from pregnane series compounds in that the former lack the methyl group at $C_{19}$ attached to $C_{10}$ that characterizes the latter.

Stigmastane series is defined herein as those compounds containing the carbon atom skeleton:

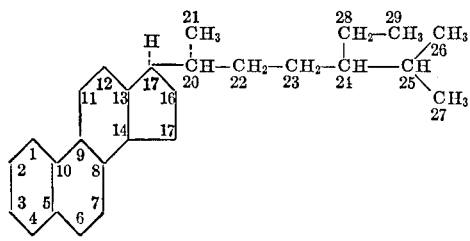

Spirostane series is defined herein as those compounds containing the carbon atom skeleton:

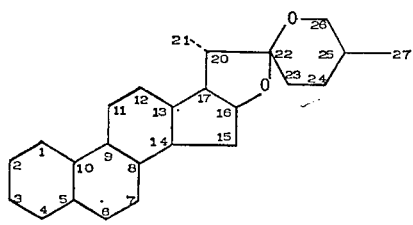

Examples of alkyl of from one through twelve carbon atoms are methyl, ethyl, propyl, butyl, pentyl, hexyl, heptyl, octyl, nonyl, decyl, undecyl and dodecyl and the isomeric forms thereof. Examples of hydroxyalkyl of from one through twelve carbon atoms are hydroxymethyl, hydroxyethyl, hydroxypropyl, hydroxybutyl, hydroxypentyl, hydroxyhexyl, hydroxyheptyl, hydroxyoctyl, hydroxynonyl, hydroxydecyl, hydroxyundecyl and hydroxydodecyl and the isomeric forms thereof. Examples of cycloalkyl are cyclopropyl, cyclobutyl, cyclopentyl, cyclohexyl, cycloheptyl, cyclooctyl, 2-methylcyclobutyl, 2,3-diethylcyclobutyl, 4-propylcyclobutyl, 3 - cyclopentylpropyl, etc. Examples of aryl are phenyl, diphenyl, naphthyl, anthryl, etc. Examples of alkaryl are tolyl, xylyl, 2,4,6-triethylphenyl, 3-butylxylyl, 5-hexyltolyl, 2-propyl-3-octyl-naphthyl, 2-pentyl-4-decylnaphthyl, 3-decyl-5-anthnyl, etc., and the isomeric forms thereof. Examples of aralkyl are benzyl, phenethyl, α-phenylpropyl, α-naphthylbutyl, β-anthrylpropyl, etc., and the isomeric forms thereof.

The 6-methylenation process of this invention is generally applicable to the enolic derivatives of 3-keto-Δ⁴-steroids. It can be successfully applied to androstane, 19-norandrostane, 9β,10α-androstane, pregnane, 19-norpregnane, 9β,10α-pregnane, spirostane, cholestane ergostane and stigmastane series compounds. The foregoing starting compounds can contain the substituents listed below:

Hydroxyl groups and functional derivatives thereof in such positions of the steroid nucleus as 11, 12, 14, 15, 16 (including 16-hydroxymethyl), 17, 18, 20 and 21 (including the condensation products of 16α,17α-glycols with carbonyl components), Carbonyl groups such as at $C_{11}$, $C_{12}$, $C_{15}$, $C_{16}$, $C_{17}$, $C_{18}$, $C_{19}$ and $C_{20}$ Carbalkoxy groups at $C_{13}$, $C_{16}$ and $C_{17}$, or in the side chain, Alkyl groups other than at $C_4$ and $C_6$, especially at $C_2$, $C_7$, $C_{11}$, $C_{16}$, $C_{17}$ and $C_{21}$, Vinyl, allyl, alkynyl and haloalkynyl groups at $C_{17}$, Methylene and ethylidene groups at $C_{11}$, $C_{16}$, $C_{17}$ and $C_{16}$–$C_{17}$, Lactone, ether and spiroketal residues such as

—O·CO·CH₂— attached to $C_{17}$, etheric groups at $C_{16}$, and bridging $C_{18}$ and $C_{20}$; spiroketal moieties such as are present in disogenone and spirostane, Chlorine, bromine or fluorine substituents in rings C or D or in the side chain, Unsaturated linkages at $C_{1(2)}$, $C_{9(11)}$, $C_{11}$, $C_{14}$, $C_{16}$ and $C_{17(20)}$, Ketol groups at $C_{11}$–$C_{12}$, $C_{16}$–$C_{17}$, $C_{17}$–$C_{20}$ and $C_{20}$–$C_{21}$, Epoxides at $C_{16}$–$C_{17}$ and $C_9$–$C_{11}$, Corticord side chains which can be acylated, diacylated, condensed with carbonyl components such as formaldehyde or acetone (as 2,2-dimethoxypropane) or with ester components such as ethyl orthoformate, ethyl acetoacetate or other functional derivatives thereof as are known to those skilled in the steroid art.

The processes of this invention can be used for preparing the 6-methylene counterparts (III) of the 6-(N,N-disubstituted) aminomethyl compounds (II) obtained from the corresponding 3-enol ethers (and acyl derivatives thereof) (I), which are in turn derived from such 3-keto-4-enes as those that follow: testosterone, 2-methyltestosterone, 17α-methyl-testosterone,
9(11)-dehydro-17α-methyltestosterone,
17α-propynyl-testosterone,
17α-acyloxyprogesterone,
9(11)-dehydro-17α-acyloxyprogesterone,
16-methyl-17α-acyloxyprogesterone,
9(11)-dehydro-16-methyl-17α-acyloxyprogesterone,
16-methylene-17α-acyloxyprogesterone,
9(11)-dehydro-16-methylene-17α-acyloxy-progesterone,
17α-acyloxy-16-ethylideneprogesterone,
16α,17α-dimethylmethylenedioxyprogesterone,
9(11)-dehydro-16α,17α-dimethylmethylenedioxyprogesterone,
cortisone,
16-methylcortisone,
21-methylcortisone,
16-methylenecortisone,
16α-hydroxy cortisone and the (16α,17α)-acetonide thereof,
hydrocortisone,
16-methylhydrocortisone,
21-methylhydrocortisone,
16-methylenehydrocortisone,
16α-hydroxyhydrocortisone and the (16α,17α)-acetonide thereof,
17α,21-dihydroxypregna-4,9(11)-dione,3,20-dione,
16-methyl-17α,21-dihydroxypregna-4,9(11)-diene-3,20-dione,
21-methyl-17α,21-dihydroxypregna-4,9(11)-diene,3,20-dione,
16-methylene-17α,21-dihydroxypregna-4,9(11)-diene-3,20-dione,
16α-hydroxy-17α,21-dihydroxypregna-4,9(11)-diene-3,20-dione
and the (16,17)-acetonide thereof,
21-fluoro-17α-hydroxypregna-4,9(11)-diene-3,20-dione and the (16,17)-acetonide thereof,
21-fluoro-17α-hydroxypregn-4-ene-3,11-20-trione and the (16,17)-acetonide thereof,
21-fluoro-11,17α-dihydroxypregn-4-ene-3,20-dione and the (16,17)-acetonide thereof,
21-hydroxypregna-4,17-dien-3-one,
11-oxo-21-hydroxypregna-4,17-dien-3-one,
11,21-dihydroxypregna-4,17-dien-3-one,
9(11)-dehydro-21-hydroxypregna-4,17-dien-3-one,
3-oxo-pregna-4,17(20)-dien-21-oic acid (esters),
3,11-dioxopregna-4,17(20)-dien-21-oic acid (esters),
11-hydroxy-3-oxopregna-4,17(20)-dien-21-oic acid (esters),
9(11)-dehydro-3-oxopregna-4,17(20-dien-21-oic acid (esters),
21-fluoro-17α-acyloxyprogesterone, progesterone,
16-methylprogresterone,
11-oxoprogesterone,
9(11)-dehydroprogesterone,
21-methylprogesterone, diosgenone,
17α-cyano-17β-hydroxyandrost-4-en-3-one,
16-methyl-16,17-dehydroprogesterone,
16-cyano-progesterone,
16-carbalkoxyprogesterone,
16-hydroxymethylprogesterone,
3-(3-oxo-17β-hydroxy-androst-4-en-17α-yl) propionic acid,
21-fluoroprogesterone,
testoloacetone,
16-fluoro-corticoids,
17α-hydroxyprogesterone,
3,11-dioxopregna-1,4,17(20)-trien-21-oic acid (esters),
1-methoxy-3,11-dioxopregna-4,17(20)-dien-21-oic acid (esters),
11α (and β),
17α-dihydroxy progesterone,
11-oxo-17α-hydroxyprogesterone,
3-oxo-11β-21-dihydroxypregna-4,17(20)-diene (21-acetate),
and 3-oxo-11β,21-dihydroxypregna-1,4,17(20)-triene (21-acetate).

The 9α-fluoro derivatives of the above 11β-hydroxy and 11-keto steroids.

It is well known in the steroid art that the introduction of a 6-methyl group into a steroid molecule often imparts significant biological activity to the thus methylated compound. Consequently, the 6-methylene steroids (III) prepared by the processes of this invention can be advantageously converted to 6-methyl steroids, for example, by the hydrogenation method described in Tetrahedron 21, 1619.

The novel processes of this invention for preparing the 6-methylene steroids of Formula III are described in sections A, B, C and D that follow.

(A) In carrying out the process of the present invention indicated by steps I→II→III in the flow-sheet, above, a compound of Formula I in a solvent (such as methanol, ethanol, propanol, isopropanol, t-butanol, tetrahydrofuran, dioxane, 1,2-dimethoxyethane, etc.) has a secondary amine, formaldehyde (in the form of a 20 to 40% aqueous solution or as paraformaldehyde) and a strong acid added thereto and the reaction mixture maintained at ambient to reflux temperature, to give the 3-keto-Δ⁴-6β-(N,N-disubstituted) aminomethyl counterpart (II). Mixing a thus produced corresponding compound (II) with a strong acid, e.g., hydrochloric, sulfuric, etc., yields a corresponding 6-methylene steroid (III). In this process $R^1$ and $R^2$ of Formula II are selected from the group consisting of alkyl of from one through twelve carbon atoms and aryl of from six through fourteen carbon atoms, with the proviso that $R^1$ and $R^2$ cannot both be alkyl.

The molar equivalents of secondary amine and formaldehyde must be equal to or greater than that of the starting steroid (I). The molecular ratios of the compound of Formula I, the secondary amine and formaldehyde can be varied, molar ratios of about 1:1:1 up to those wherein the amine and formaldehyde are about twenty times that of the starting steroid compound (I), are satisfactory. Since formaldehyde is quite volatile and the reaction time relatively long, a large excess can be added initially or additional formaldehyde added periodically during the course of the reaction.

The choice of solvent is dictated to some extent by the solubility of the starting enol ether (I) in that solvent. Alcohols such as those listed above can be employed, but polar aprotic solvents such as tetrahydrofuran, dioxane and 1,2-dimethoxyethane are the most efficient.

The secondary amine can be employed as the free base or, part may be added as an acid salt (e.g., the hydrochloride, sulfate or p-toluenesulfonate) of the amine. Aromatic secondary amines such as diphenylamine, methylnaphthylamine, N - methylaniline, N-ethylaniline, N-methyl-p-toluidine, etc., can be employed.

The time required for the completion of the reaction depends upon such factors as the type of secondary amine, the particular starting steroid (I), its solubility, its relative amount in relation to secondary amine and formalehyde, thoroughness of mixing, solvent and the like. Therefore it will be understood that the optimum reaction time will vary for each set of reaction conditions. Ordinarily, the reaction will go to completion within from about 30 minutes to about five days.

After completion of the reaction between I, the amine and formaldehyde, the thus formed 6β-(N,N-disubstituted) aminomethyl product (II) is readily isolated in high yield from the reaction mixture by conventional means; for example, by evaporating the solvent, dissolving the residue in a solvent (such as benzene), extracting the solution with water, then dilute acid, neutralizing the acid phase with dilute alkali (e.g., sodium carbonate) and extracting with a solvent such as methylene chloride, washing the methylene chloride layer with water, then drying and evaporating the methylene chloride to give a high yield of product (II). Mixing a thus produced corresponding compound of Formula 11 (at from about 0° C. to about 50° C.) with a strong acid (e.g., aqueous or alcoholic hydrochloric or sulfuric acid) precipitates a corresponding 6-methylene compound (III), which can be recovered by filtration, centrifugation, etc.

(B) In the process of the present invention shown of I→II→IV→III in the flow-sheet, above, the compounds of Formula II wherein $R^1$ and $R^2$ are alkyl of from one through twelve carbon atoms, or together polymethylene, are prepared from the corresponding compounds of Formula I essentially as described in A, above. However, such compounds of Formula II before being converted to their 6-methylene counterparts (III) must first have the nitrogen atom quaternized. This can be accomplished by reacting a compound of Formula II with an alkylating agent such as (a) an alkyl halide (e.g., methyl iodide, ethyl iodide, methyl bromide, ethyl bromide, etc.) to form a corresponding quaternary halide of Formula IV or (b) a dialkyl sulfate (e.g., dimethyl sulfate, diethyl sulfate, etc.) to give a corresponding alkylosulfate of Formula IV. The preparation of the quarternary halides and alkylsulfates of Formula IV can be carried out by reacting the 6β-dialkylaminomethyl steroid (II) with the alkyl halide or dialkyl sulfate in an organic solvent such as methanol, isopropanol, t-butanol, acetone, ether, benzene, toluene, hexane, tetrahydrofuran, dioxane, 1,2-dimethoxyethane, etc., at temperatures ranging from ambient to reflux, with the reaction time and temperature employed depending on the solvent and alkylating agent used. The compounds of Formula IV are converted to the corresponding 6-methylene steroids (III) by treatment with a base (e.g., aqueous sodium carbonate, potassium carbonate, sodium bicarbonate, sodium hydroxide, etc.), preferably at room temperaute or somewhat above, with the product (III) that precipitates being recovered by conventional means (e.g., filtration).

(C) In carrying out the process of the invention indicated by the reaction sequence I→II→IV→VI→III in the flow-sheet, above, the compounds of Formula II wherein $R^1$ and $R^2$ are alkyl of from one through twelve carbon atoms, or together polymethylene, are prepared from the corresponding compounds of Formula I essentially as described in A, above. The step II→IV of the process (relating to the quaternizing of the nitrogen of the compounds of Formula II) is carried out in the same manner as in B, above. The thus produced quaternary halides and alkylsulfates of Formula IV are subjected to enol etherification at the 3-position of the steroid nucleus employing known procedures to yield the corresponding 3-alkoxy-Δ³,⁵-steroids (VI), e.g., by heating at reflux for several hours with a 2,2-dialkoxypropane (such as 2,2-dimethoxypropane, 2,2-diethoxypropane, etc.) with an acid such as p-toluenesulfonic acid, in a solvent such as dimethylformamide, methanol, etc. The enol ethers (VI) can also be produced by the reaction of the compounds of Formula IV at room temperature to about 50° C. for from about 1 to 3 hours with an alkyl orthoformate (such as methyl orthoformate, ethyl orthoformate, etc.) with an acid (e.g., p-toluenesulfonic acid, sulfuric acid, etc.) in a solvent such as dioxane, methanol, etc. Addition of water to the reaction mixture containing a thus produced compound of Formula VI precipitates the crystalline 6-methylene product (III) which is isolated by filtration.

(D) In the process of the invention shown by I→II→V→III of the flow-sheet, above, the compounds of Formula II wherein R¹ and R² are alkyl of from one through twelve carbon atoms, or together polymethylene, are prepared from the corresponding compounds of Formula I in the manner described in A, above. The N-oxides of Formula V are prepared from the corresponding compounds of Formula II in the same manner as the alkyl halides and alkylosulfates embraced by Formula IV, by substituting hydrogen peroxide for the alkylating agents employed in the step II→IV in the processes described in sections B and C, above. The thus produced N-oxides (V) are converted to the corresponding compounds of Formula III by merely heating them (at about 70° for about 30 minutes) in an inert solvent, such as methanol, tetrahydrofuran, etc., generally the one in which the compound of Formula V is prepared; the product (III) that precipitates is isolated by filtration. In those instances where the elimination of step V→III is difficult, it can be facilitated by adding a basic substance such as a tertiary amine (e.g., trimethylamine, methylethylamine, methyldiphenylamine, etc.) or an alkali metal carbonate, such as sodium carbonate, potassium carbonate, etc.

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

EXAMPLE 1

Methyl 6-methylene-3,11-dioxo-4,17(20)-pregnadien-21-oate (III)

(a) Methyl 6β - (N - phenyl - N - methylaminomethyl) - 3,11 - dioxo - 4,17(20) - pregnadien - 21 - oate (II).—To 60 ml. of tetrahydrofuran containing 6.45 g. of methyl 3 - methoxy - 3,5,17(20) - pregnatrien - 11-oxo-21-oate (I) is added 6 ml. of 37% Formalin, 2.0 ml. N-methyl aniline and 100 mg. of p-toluenesulfonic acid. This mixture is stirred at room temperature for about 45 minutes and poured into very dilute sodium carbonate. The mixture is extracted with methylene chloride, dried over sodium sulfate and evaporated in vacuo to give a high yield of methyl 6β - (N - phenyl - N - methylaminomethyl)-3,11-dioxo-4,17(20)-pregnadien-21-oate (II).

Using the procedure of (a), above, but substituting other secondary amines, such as (1) N-ethyl aniline,
(2) Diphenylamine,
(3) N-methyl-p-toluidine,
(4) N-ethyl-p-toluidine,etc., yields, respectively, (1) Methyl 6β-(N-ethyl-N-phenylaminomethyl)-3,11-dioxo-4,17(20)-pregnadien-21-oate (II),
(2) Methyl 6β-N,N-diphenylaminomethyl-3,11-dioxo-4,17(20)-pregnadien-21-oate (II),
(3) Methyl 6β-(N-methyl-N-p-toluylaminomethyl)-3,11-dioxo-4,17(20)-pregnadien-21-oate (II).
(4) Methyl 6β-(N-ethyl-N-p-toluylaminomethyl)-3,11-dioxo-4,17(20)-pregnadiene-21-oate (II), etc.

(b) Methyl 6 - methylene - 3,11 - dioxo - 4,17(20)-pregnadien-21-oate (III).—5 g. of methyl 6β-(N-phenyl-N - methylaminomethyl) - 3,11 - dioxo - 4,17(20) - pregnadien-21-oate (II), prepared as in (a), above is dissolved in 40 ml. of 6 N hydrochloric acid. After about 10 minutes at room temperature, crystals of methyl 6-methylene-3,11 - dioxo - 4,17(20) - pregnadien - 21 - oate (III) precipitated. After about 3 hours a quantitative yield of product (III) was obtained by filtration of the reaction mixture.

Following the procedure of (b), above, the 3-keto-Δ⁴-6β-(N,N-disubstituted) aminomethyl derivatives (II) obtained following (a), above, are converted to methyl 6-methylene-3,11-dioxo-4,17(20)-pregnadien-21-oate (III).

EXAMPLE 2

6-methylene-17α-hydroxy-4-pregnene-3,20-dione (III)

Following the procedure of Example 1 but substituting 3-methoxy-17α-hydroxy-3,5-pregnadien-20-one (I) as starting material yields (a) 6β-(N-methyl-N-phenylaminomethyl) 17α-hydroxy-4-pregene-3,20-dione (II) and (b) 6 - methylene - 17α - hydroxy - 4 - pregnene - 3,20-dione (III).

EXAMPLE 3

Methyl 6-methylene-3,11-dioxo-1,4,17(20)-pregnatrien-21-oate (III)

Following the procedure of Example 1 but substituting methyl 1α,3 - dimethoxy - 3,5,17(20) - pregnatrien - 11-one 21-oate (I) yields (a) 6β - (N - methyl - N - phenylaminomethyl) - 3,11 - dioxo - 1,4,17(20) - pregnatriene-21-oate (II) and (b) methyl-6 - methylene - 3,11 - dioxo-1,4,17(20)-pregnatrien-21-oate (III).

EXAMPLE 4

6-methylene-17β-hydroxy-17α-methyl-4,9(11)-androstadien-3-one (III)

Following the procedure of Example 1 but substituting 3 - ethoxy - 17β - hydroxy - 17α - methyl - 3,5,9(11)-androstatriene (I) yields (a) 6β - (N - methylanilinomethyl) - 17β - hydroxy - 17α - methyl - 4,9(11) - androstadien - 3 - one (II) and (b) 6 - methylene - 17β - hydroxy-17α-methyl-4,9(11)-androstadien-3-one (III).

EXAMPLE 5

6-methylene-9α-fluoro-11β,17α,21-trihydroxy-4-pregnene-3,20-dione 21-acetate (III)

Following the procedure of Example 1 but substituting 3 - anthryloxy - 9α - fluoro - 11β,17α,21 - trihydroxy - 3,5-pregnadien-20-one 17-acetate (I) and N-methyl-p-toluidine yields (a) 6,β - (N - methyl - p - toluidinomethyl)-9α - fluoro - 11β,17α,21 - trihydroxy - 4 - pregnene - 3,20-dione 21-acetate (III) and (b) 6 - methylene - 9α - fluoro-11β,17α,21 - trihydroxy - 4 - pregnene - 3,20 - dione 21-acetate (III).

EXAMPLE 6

6-methylene-4-estrene-3,17-dione (III)

Following the procedure of Example 1 but substituting 3 - methoxy - 3,5 - estradien - 17 - one (I) and diphenylamine, yields (a) 6β - diphenylaminomethyl - 4 - estrene-3,17-dione (II) and (b) 6-methylene-4-estrene-3,17-dione (III).

EXAMPLE 7

6-methylene-9β,10α-pregn-4-ene-3,20-dione (III)

Following the procedure of Example 1 but substituting 3 - ethoxy - 9β,10α - pregna - 3,5 - dien - 20 - one (I) yields (a) 6β - (N - methylanilinomethyl) - 9β,10α-pregn - 4 - ene - 3,20 - dione (II) and 6 - methylene-9β,10α-pregn-4-ene-3,20-dione (III).

EXAMPLE 8

6-methylene-17-oxa-D-homo-4-androstene-3,17-dione (III)

Following the procedure of Example 1 but substituting 3 - ethoxy - 17 - oxa - D - homo - 3,5 - androstadien - 17-one (I) and ethylphenylamine, yields (a) 6β - ethylphenylaminomethyl - 17 - oxa - D - homo - 4 - androstene- 3,17-dione (II) and (b) 6-methylene-17-oxa-D-homo-4-androstene-3,17-dione (III).

EXAMPLE 9

6,16-dimethylene-17α-hydroxy-4-pregnene-3,20-dione 17-acetate (III)

Following the procedure of Example 1 but substituting 3 - isopropoxy - 17α - hydroxy - 16 - methylene - 3,5-pregnadien-20-one 17-acetate (I) and N-methyl-p-toluidine yields (a) 6β - (N - methyl - p - toluidinomethyl)-17α - hydroxy - 16 - methylene - 4 - pregnene - 3,20-dione 17-acetate (II) and 6,16-dimethylene-17α-hydroxy-4-pregnene-3,20-dione 17-acetate (III).

EXAMPLE 10

6-methylene-17α-hydroxy-4-pregnene-3,20-dione 17-acetate (III)

Following the procedure of Example 1 but substituting 3 - propoxy - 17α - hydroxy - 3,5 - pregnadien - 20 - one 17-acetate (I) yields (a) 6β - (N - phenyl - N - methylaminomethyl) - 17α - hydroxy - 4 - pregnene - 3,20 - dione 17-acetate and (b) 6-methylene-17α-hydroxy-4-pregnene-3,20-dione 17-acetate (III).

EXAMPLE 11

6-methylene-17α-hydroxy-4-pregnene-3,20-dione 17-acetate (III)

(a) 6β-piperidinomethyl - 17α-hydroxy-4-pregnene-3,20-dione 17-acetate (II).—To a solution of 3 g. of 17α-hydroxy-3-methoxy3,5-pregnadien-20-one 17-acetate (I) in 30 ml. of tetrahydrofuran, 1.5 ml. of piperidine, 0.5 ml. of 37% Formalin and 10 mg. of p-toluenesulfonic acid is added. This solution is refluxed on a steam bath for about 100 hours. During the reflux period, increments totalling 3 ml. of Formalin and 2 ml. of piperidine are added. The tetrahydrofuran is evaporated and the resulting residue extracted with benzene. The benzene solution is extracted with water and then with 0.2 N sulfuric acid. The acid phase is neutralized with dilute sodium carbonate solution and then extracted with methylene chloride. The methylene chloride layer is washed with dilute hydrochloric acid solution, dilute sodium carbonate solution, dried and the solvent evaporated to give a high yield of 6β-piperidinomethyl-17α-hydroxy-4-pregnene-3,20-dione 17-acetate (II).

Following the procedure of (a), above, of Example 11 but using 1.5 g. of p-toluenesulfonic acid instead of 10 mg. thereof, the reaction producing 6β-piperidinomethyl-17α-hydroxy-4-pregnene-3,20-dione 17-acetate (II) is complete in 3 hours.

Following the procedure of (a), above, of Example 11 and the paragraph thereafter but substituting other secondary amines, such as (1) morpholine,
(2) 2-propylpiperidine,
(3) 2,6-dimethylpiperidine,
(4) 2-ethyl-6-methylpiperidine,
(5) pyrrolidine,
(6) 3-ethylpyrrolidine,
(7) 2,4-dimethylpyrrolidine,
(8) dimethylamine,
(9) ethylbutylamine, etc., yields, respectively, (1) 6β-morpholinomethyl-17α-hydroxy-4-pregnene-3,20-dione 17-acetate (II),
(2) 6β-(2-propyl piperidinomethyl)-17α-hydroxy-4-pregnene-3,20-dione 17-acetate (II),
(3) 6β-(2,6-dimethyl piperidinomethyl)-17α-hydroxy-4-pregnene-3,20-dione 17-acetate (II),
(4) 6β-(2-ethyl-6-methyl piperidinomethyl)-17α-hydroxy-4-pregnene-3,20-dione 17-acetate (II),
(5) 6β-pyrrolidinomethyl-17α-hydroxy-4-pregnene-3,20-dione 17-acetate (II),
(6) 6β-(3-ethylpyrrolidinomethyl)-17α-hydroxy-4-pregnene-3,20-dione 17-acetate (II),
(7) 6β-(2,4-dimethylpyrrolidinomethyl)-17α-hydroxy-4-pregnene-3,20-dione 17-acetate (II),
(8) 6β-dimethylaminomethyl-17α-hydroxy-4-pregnene-3,20-dione 17-acetate (II),
(9) 6β-ethylbutylaminomethyl-17α-hydroxy-4-pregnene-3,20-dione 17-acetate (II), etc.

(b) 6β-piperidinomethyl-17α-hydroxy-4-pregnene-2,20-dione 17-acetate methiodide (IV)

To 5 g. of 6β - piperidinomethyl-17α-hydroxy-4-pregnene-3,20-dione 17-acetate (II), prepared as in (a), above, in 50 ml. of benzene, 5 g. of methyl iodide is added, and the mixture stirred at room temperature for about 16 hours. The solvent is evaporated under vacuum and the methiodide residue (IV) triturated with ether.

Following the procedure of (b) of Example 11 but substituting methyl bromide for methyl iodide, yields 6β-piperidinomethyl-17α - hydroxy-4 - pregnene - 3,20-dione 17-acetate methobromide (IV) and substituting dimethyl sulfate for methyl iodide yields the corresponding methosulfate.

(c) 6-methylene-17α-hydroxy-4-pregnene-3,20-dione 17-acetate (III)

The residue containing the methiodide (IV) obtained in (b), above, is dissolved in 20 ml. of 1 N sodium carbonate solution and the resulting solution allowed to stand at room temperature for about 16 hours. The crystals of 6-methylene-17α - hydroxy-4-pregnene-3,20-dione 17-acetate (III) that formed were separated by filtration.

EXAMPLE 12

6-methylene-11β,17α,21-trihydroxy-4-pregnene-3,20-dione 17-valerate (III)

Following the procedure of Example 11 and the paragraphs thereafter but substituting 1α,3-dibutoxy-11β,17α,21-trihydroxy-3,5-pregnadien-20-one 17-valerate (I) and 2-propylperidine for the starting material (I) and secondary amine employed therein, yields (a) 6β-(2-propylpiperidinomethyl)-1α-butoxy - 11β,17α,21-trihydroxy-4-pregnene-3,20-dione 17-valerate (II), (b) the corresponding methiodide (IV) and (c) 6-methylene-11β,17α,21-trihydroxy-1,4-pregnadiene-3,20-dione 17-valerate (III).

EXAMPLE 13

Ethyl 6-methylene-3-keto-1,4,17(20)-pregnatrien 21-oate (III)

Following the procedure of Example 12 but substituting 3-cyclopentyloxy - 1,3,5,17(20) - pregnateraene-21-ethyl-oate (I) and 2,6-dimethylpiperidine yields (a) 6β-(2,6-dimethylpiperidinomethyl) - 3-keto-1,4,17(20)-pregnatrien-21oate (II), (b) the corresponding methiodide (IV) and (c) ethyl 6-methylene-3-keto-1,4,17(20)-pregnatrien-21-oate (III).

EXAMPLE 14

6-methylene-17α,21-dihydroxy-1,4-pregnadiene-3,11,20-trione 21-butyrate (III)

Following the procedure of Example 12 but substituting 3-(β-hydroxypropoxy)-17α,21-dihydroxy-1,3,5-pregnatriene-11,20-dione 21-butyrate (I) and diethylamine, yields (a) 6-diethylaminomethyl-17α,21 - hydroxy-1,4-pregnadiene-3,11,20-trione 21-butyrate (II), (b) the corresponding methiodide (IV) and (c) 6-methylene-17α,21-dihydroxy-1,4-pregnadiene-3,11,20-trione 21-butyrate (III).

EXAMPLE 15

6-methylene-17α-methyl-17β-hydroxy-4-androsten-3-one 17-propionate (III)

Following the procedure of Example 12 but substituting 3-benzyloxy-17α-methyl - 17β-hydroxy-3,5-androstadiene 17-propionate (I) and pyrrolidine, yields (a) 6β-pyrrolidinomethyl-17α-methyl - 17β-hydroxy-4-androsten-3-one 17-propionate (III), (b) the corresponding methobromide (IV) and (c) 6-methylene-17α-methyl-17β-hydroxy-4-androsten-3-one 17-propionate (III).

EXAMPLE 16

6-methylene-17α-hydroxy-4-pregnene-3,20-dione (III)

Following the procedure of Example 12 but substituting 3-ethoxy-17α-hydroxy-3,5-pregnadien-20-one (I) and 3-ethylpyrrolidine, yields (a) 6β-(3-ethylpyrrolidinomethyl)-17α-hydroxy-4-pregnene-3,20-dione (I), (b) the corresponding methiodide (IV) and (c) 6-methylene-17α-hydroxy-4-pregnene-3,20-dione (III).

EXAMPLE 17

6-methylene-4-pregnene-3,11,20-trione (III)

Following the procedure of Example 12 but substituting 3 - naphthoxy - 3,5 - pregnadiene - 11,20-dione (I) and 2,4 - dimethylpyrrolidine (II), yields (a) 6β - (2,4-dimethylpyrrolidinomethyl) - 4 - pregnene - 3,11,20-trione (II), (b) the corresponding methiodide (IV) and 6-methylene-4-pregnene-3,11,20-trione (III).

EXAMPLE 18

6-methylene-4-androstene-3,17-dione (III)

Following the procedure of Example 12 but substituting 3-phenoxy-3,5-androstadien-17-one (I) and ethylbutylamine, yields (a) 6β - ethylbutylaminomethyl - 4 - androstene - 3,17 - dione (II), (b) the corresponding methiodide (IV) and (c) 6-methylene-4-androstene-3,17-dione (III).

EXAMPLE 19

Methyl 6-methylene-3,11-dioxo-1,4,17(20)-pregnadien-21-oate (III)

Following the procedure of Example 12 but substituting methyl 1α,3 - dimethoxy - 3,5,17(20) - pregnatrien-11 - one - 21 - oate (I) and dimethylamine, yields (a) methyl 1α - methoxy - 6β - dimethylaminomethyl-3,11-dioxo - 4,17(20) - pregnadiene - 21 - oate (III), (b) the corresponding methiodide (IV) and (c) 1α - methoxy-6 - methylene - 3,11 - dioxo - 4,17(20) - pregnadiene - 21-oate (III).

EXAMPLE 20

6-methylene-17α-ethynyl-17β-hydroxy-4-androsten-3-one (III)

Following the procedure of Example 11 but substituting 3 - hexyloxy - 17α - ethynyl - 17β-hydroxy-3,5-androstadiene (I) and 2 - propylpiperidine, yields (a) 6β - (2-propylpiperidinomethyl) - 17α - ethynyl - 17β - hydroxy-4-androsten-3-one (II), (b) the corresponding methosulfate (IV) and (c) 6 - methylene - 17α - ethynyl-17β-hydroxy - 4 - androsten - 3 - one (III).

EXAMPLE 21

6-methylene-25D-spirosta-4-en-3-one (III)

Following the procedure of Example 11 but substituting 3 - (3 - propylphenoxy) - 25D - spirosta - 3,5 - diene (I) and 2,6 - dimethylpiperidine, yields (a) 6β - (2,6-dimethylpiperidinomethyl) - 25D - spirosta - 4-en-3-one (II), (b) the corresponding methosulfate (IV) and (c) 6-methylene-25D-spirosta-4-en-3-one (III).

EXAMPLE 22

6-methylene-11β,17α,21-trihydroxy-4-pregnene-3,20-dione 17α,21-acetonide (III)

Following the procedure of Example 11 but substituting 3-phenoxy - 11β,17α,21 - trihydroxy - 3,5-pregnadien-20 - one 17α,21 - acetonide (I) and 2-ethyl-6-methylpiperidine, yields (a) 6β - (2 - ethyl - 6 - methylpiperidinomethyl) - 11β,17α,21 - trihydroxy - 4 - pregnene - 3,20-dione 17α,21 - acetonide (II), (b) the corresponding methosulfate (IV and (c) 6 - methylene - 11β,17α,21-trihydroxy - 4 - pregnene-3,20-dione 17α,21-acetonide (III).

EXAMPLE 23

6-methylene-17β-hydroxy-17α-vinyl-1,4-androstadien-3-one (III)

Following the procedure of Example 11 but substituting 3 - butoxy - 17β - hydroxy - 17α - vinyl-1,3,5-androstatriene (I) and pyrrolidine, yields (a) 6β-pyrrolidino-17β-hydroxy - 17α - vinyl - 1,4-androstadien-3-one (II), (b) the corresponding methosulfate (IV) and (c) 6 - methylene - 17β - hydroxy - 17α - vinyl-1,4-androstadien-3-one (III).

EXAMPLE 24

6-methylene-17α,21-methoxymethylenedioxy-4-pregnene-3,11,20-trione (III)

Following the procedure of Example 11 but substituting 3 - (3 - butylphenoxy) - 17α,21 - methoxymethylenedioxy-3,5 - pregnadiene - 11,20-dione (I) and 3-ethylpyrrolidine, yields (a) 6β - (3 - ethylpyrrolidinomethyl) - 17α,21-methovymethylenedioxy - 4 - pregnene - 3,11 - 20 - trione (II), (b) the corresponding methosulfate (IV) and (c) 6 - methylene - 17α,21 - methoxymethylenedioxy - 4-pregnene-3,11,20-trione (III).

EXAMPLE 25

6-methylene-17α-hydroxy-4-pregnene-3,20-dione 17-acetate (III)

(a) 6β-piperidinomethyl-17α-hydroxy-4-pregnene-3,20-dione 17-acetate (II)

This compound and others of Formula II are prepared in the manner described in (a) of Example 11, above, employing 17α - hydroxy-3-methoxy-3,5-pregnadien-20-one 17-acetate (I) as starting material. Other 3-keto-Δ⁴-6β-(N,N-disubstituted) aminomethyl compounds, e.g., morpholinomethyl, pyrrolidinomethyl, etc., can be prepared in the manner described in Example 11, above.

(b) 6β-piperidinomethyl-17α-hydroxy-4-pregnene-3,20-dione 17-acetate methosulfate (IV)

To 2 g. of 6β-piperidinomethyl - 17α - hydroxy-4-pregnene - 3, 20 - dione 17 - acetate (II) obtained as in (a), above, in 30 ml. of methanol, 5 ml. of dimethyl sulfate is added and the solution heated at about 45° C. for about 2 hours, to yield 6β - piperidinomethyl-17α-hydroxy - 4 - pregnene - 3,20 - dione 17-acetate methosulfate (IV).

(c) 6β-piperidinomethyl-17α-hydroxy-3-methoxy-3,5-pregnadien-20-one 17-acetate methosulfate (VI)

To the methosulfate (IV) prepared in (b), above, 5 ml. of trimethylorthoformate and 0.5 ml. of concentrated sulfuric acid is added and the mixture heated at about 45° C. for about 2.5 hours to yield 6β-piperidinomethyl-17α - hydroxy - 3 - methoxy - 3,5 - pregnadien-20-one 17-acetate methosulfate (VI).

(d) 6-methylene-17α-hydroxy-4-pregnene-3,20-dione 17-acetate (III)

To the 3-enol ether (VI) produced in (c), above, 10 ml. of water is added and crystals of 6-methylene-17α-hydroxy - 4 - pregnene - 3,20 - dione 17 - acetate (III) precipate and are isolated by filtration.

EXAMPLE 26

6-methylene-4-pregnen-18-oic acid (18–20) lactone-3-one (III)

Following the procedure of Example 25 but substituting 3 - (2-propylnaphthoxy)-3,5,-pregnadien-18-oic acid (18–20) lactone (I) and dipropylamine, yields (a) 6β - (di - N - propylaminomethyl)-4-pregnene-18-oic acid (18–20) lactone-3-one (II), (b) the corresponding methosulfate (IV), (c) the corresponding 3-enoyl ether (VI) and (d) 6-methylene-4-pregnene-18-oic acid (18–20) lactone-3-one (III).

EXAMPLE 27

6-methylene-16α,17α-isopropylidene-dioxy-4-pregnene-3,20-dione (III)

Following the procedure of Example 25 but substituting 3 - tolyloxy - 16α,17α-isopropylidenedioxy-3,5-pregnadiene-20-one (I) and dimethylamine, yields (a) 6β - dimethylaminomethyl - 16α,17α-isopropylidenedioxy-4-pregnene-3,20-dione (II), (b) the corresponding methosulfate (IV), (c) the corresponding 3-enol ether (VI) and (d) 6-methylene-16α,17α-isopropylidenedoxy-4-pregnene-3,20-dione (III).

EXAMPLE 28

6-methylene-16-methyl-4,16-pregnadiene-3,20-dione (III)

Following the procedure of Example 25 but substituting 3 - methoxy - 16-methyl-3,5,16-pregnatrien-20-one (I), yields (a) 6β-piperidinomethyl-16-methyl-4,16-pregnadiene-3,20-dione (II), (b) the corresponding methosulfate (IV), (c) the corresponding 3-enol ether and (d) 6 - methylene-16-methyl-4,16-pregnadiene-3,20-dione (III).

EXAMPLE 29

6-methylene-17β-hydroxy-19-nor-4-androsten-3-one 17-propionate (III)

Following the procedure of Example 25 but substituting 3 - propoxy - 17β - hydroxy - 19-nor-3,5-androstadiene 17-propionate (I) and 2-propylpiperidene, yields (a) 6β - (2 - propylpiperidinomethyl)-17β-hydroxy-19-nor-4-androsten-3-one 17-propionate (II), (b) the corresponding methosulfate (IV, (c) the corresponding 3-enol ether (VI) and (d) 6-methylene-17β-hydroxy-19-nor-4-androstene-3-one 17-propionate (III).

EXAMPLE 30

6-methylene-20β-hydroxy-4-pregnene-3-one 20-propionate (III)

Following the procedure of Example 25 but substituting 3 - decoxy - 20β - hydroxy-3,5-pregnadiene 20-propionate (I) and 2,6-dimethylpiperidine, yields (a) 6β-(2,6 - dimethyl)piperidinomethyl - 20β - hydroxy - 4-pregne-3-one 20-propionate (II), (b) the corresponding methosulfate (IV), (c) the corresponding 3-enol ether (VI) and (d) 6-methylene-20β-hydroxy-4-pregnene-3-one 20-propionate (III).

EXAMPLE 31.—6-methylene-17α-hydroxy-4-pregnene-3,20-dione 17-acetate (III)

(a) 6β-piperidinomethyl-17α-hydroxy-4-pregnene-3,20-dione 17-acetate (II)

This compound and others of Formula II are prepared in the manner described in (a) of Example 11, above, employing 17α - hydroxy - 3-methoxy-3,5-pregnadien-20-one 17-acetate (I) as starting material. Other 3-keto-Δ⁴-6β-(N-disubstituted) aminomethyl compounds, e.g., morpholinomethyl, pyrrolidinomethyl, etc., can be prepared in the manner described in Example 11, above.

(b) 6β-piperidinomethyl-17α-hydroxy-4-pregnene-3,20-dione 17-acetate methiodide (IV)

To 5 g. of 6β - piperidinomethyl - 17α-hydroxy-4-pregnene-3,20-dione 17-acetate (II), prepared as in (a), above, in 50 ml. of benzene, 5 g. of methyl iodide is added and the mixture stirred at room temperature for about 16 hours. The solvent is evaporated under vacuum and the residue of methiodide (IV) triturated with ether.

Following the procedure of (b) of Example 32 but substituting methyl bromide for methyl iodide, yields 6β-piperidinomethyl - 17α - hydroxy - 4-pregnene-3,20-dione 17-acetate methobromide (IV).

(c) 6β-piperidinomethyl-17α-hydroxy-3-methoxy-3,5-pregnadien-20-one 17-acetate methiodide (IV)

To the methiodide (IV) prepared in (b), above, 5 ml. of trimethylorthoformate and 0.5 ml. of concentrated sulfuric acid is added and the mixture stirred at about 45° C. for about 2.5 hours to yield 6β-piperidinomethyl-17α-hydroxy-3-methoxy-3,5 - pregnadien - 20 - one 17-acetate methiodide (VI).

(d) 6-methylene-17α-hydroxy-4-pregnene-3,20-dione 17-acetate (III)

To the 3-enol ether (VI) produced in (c), above, 10 ml. of water is added and crystals of 6-methylene-17α-hydroxy-4-pregnene-3,20-dione 17-acetate (III) precipitate and are isolated by filtration.

EXAMPLE 32

6-methylene-17α,21α-dihydroxy-11β-formyloxy-4-pregnene-3,20-dione 21-acetate (III)

Following the procedure of Example 31 but substituting 3 - octoxy - 17α,21-dihydroxy-11β-formyloxy-3,5-pregnadien-20-one 21-acetate (I) and methyl ethyl amine, yields (a) 6β-(methyl ethyl aminomethyl)-17α,21-dihydroxy - 11β - formyloxy - 4-pregnene-3,20-dione 21-acetate II), (b) the corresponding methiodide (IV), (c) the corresponding 3-enol ether (VI) and (d) 6-methylene - 17α,21 - dihydroxy - 11β - formyloxy-4-pregnene-3,20-dione 17-acetate (III).

EXAMPLE 33

6-methylene-11β,17α,21-trihydroxy-1,4-pregnadiene-3,20-dione 17,21-diacetate (III)

Following the procedure of Example 3 but substituting 3 - methoxy - 11β,17α,21 - trihydroxy-1,3,5-pregnatrien-20-one 17,21-diacetate (I) and pyrrolidine, yields (a) 6β-pyrrolidinomethyl - 11β,17α,21 - trihydroxy-1,4-pregnadiene-3,20-dione 17, 21-diacetate (II), (b) the corresponding methiodide (IV), (c) the corresponding 3-enol ether (VI) and (d) 6-methylene-11β,17α,21-trihydroxy-1,4-pregnadiene-3,20-dione 17,21-diacetate (III).

EXAMPLE 34

6-methylene-2α,methyl-11β,17,21-trihydroxy-4-pregnene-3,20-dione 21-acetate (III)

Following the procedure of Example 31 but substituting 3 - methoxy - 2α-methyl-11β-17α,21-trihydroxy-3,5-pregnadien-20-one 21-acetate (I) and 3-ethylpyrrolidine, yields (a) 6β-(3-ethylpyrrolidinomethyl)-2α-methyl-11,17α,21 - trihydroxy - 4-pregnene-3,20-dione 21 acetate (II), (b) the corresponding methiodide (IV), the corresponding 3-enol ether (VI) and (d) 6-methylene-2α-methyl - 11β,17α,21 - trihydroxy - 4 - pregnene-3,20-dione 21-acetate (III).

EXAMPLE 35.—6-methylene-17α-hydroxy-4-pregnene-3,20-dione 17-acetate (IV)

(a) 6β-piperidinomethyl-17α-hydroxy-4-pregnene-3,20-dione 17-acetate (II)

This compound and others of Formula II are prepared in the manner described in Example 11, above, employing 17α - hydroxy - 3-methoxy-3,5-pregnadien-20-one 17-acetate (I) as starting material. Other 3 - keto-Δ⁴-6β-(N-disubstituted) aminomethyl compounds, e.g., morpholinomethyl, pyrrolidinomethyl, etc., can be prepared in the manner described in Example 11, above.

(b) 6β-piperidinomethyl-17α-hydroxy-4-pregnene-3,20-dione 17-acetate N-oxide (V)

To 900 mg. of 6β - piperidinomethyl-17α-hydroxy-4-pregnene-3,20-dione 17-acetate (II), prepared as in (a), above, in 10 ml. of methanol, 3 ml. of 30% hydrogen peroxide in 5 ml. of water is added and the mixture stirred at room temperature for about 72 hours to yield 6β - piperidinomethyl-17α-hydroxy-4-pregnene-3,20-dione 17-acetate N-oxide (V).

(c) 6-methylene-17α-hydroxy-4-pregnene-3,20-dione 17-acetate (IV)

The N-oxide (V) produced in (b), above, is warmed for from about 70° C. to about 75° C. for about 30 minutes, with crystals of 6 - methylene-17α-hydroxy-4-pregnene-3,20-dione 17-acetate (III) precipitating and being isolated by filtration.

EXAMPLE 36

6-methylene-11β,17α-dihydroxy-21-methyl-4-pregnene-3,20-dione (III)

Following the procedure of Example 35 but substituting 3 - ethoxy - 11β,17α-dihydroxy-21-methyl-3,5-pregnadien - 20 - one (I) and 2,4-dimethylpyrroline, yields (a) 6β - (2,4 - dimethylpyrrolidinomethyl)-11β,17α-dihydroxy-21-methyl-4-pregnene-3,20-dione (II), (b) the corresponding N-oxide (V) and (c) 6-methylene-11β,17-dihydroxy-21-methyl-4-pregnene-3,20-dione (III).

EXAMPLE 37

6-methylene-21-fluoro-17α-hydroxy-4-pregnene-3,20-dione 17-acetate (III)

Following the procedure of Example 35 but substituting 3 - methoxy-21-fluoro-17α-hydroxy-3,5-pregnadien-20-one 17 - acetate (I) and diethylamine, yields (a) 6β-diethylaminomethyl - 21 - fluoro-17α-hydroxy-4-pregnene-3,20-dione 17-acetate (II), (b) the corresponding N-oxide (V) and (c) 6 - methylene-17-acetate 17α-hydroxy-21-fluoro-4-pregnene-3,20-dione 17-acetate (III).

EXAMPLE 38

6-methylene-16-methyl-14,16-pregnatriene-3,20-dione (III)

Following the procedure of Example 35 but substituting 3-ethoxy-16-methyl-1,3,5,16-pregnatetraen-20-one (I) and pyrrolidine, yields (a) 6β - pyrrolidinomethyl-16-methyl-1,4,16-pregnatriene-3,20-dione (II), (b) the corresponding N-oxide (V) and (c) 6 - methylene-16-methyl-4,16-pregnadiene-3,20-dione (III).

EXAMPLE 39

6-methylene-19-nor-17α-ethynyl-17β-hydroxy-4-androsten-3-one (III)

Following the procedure of Example 35 but substituting 3 - cyclopentyloxy - 19-nor-17α-ethynyl-17β-hydroxy-3,5-androstadiene (I) and morpholine, yields (a) 6β-morpholinomethyl - 19-nor-17α-ethnyl-17β-hydroxy-4-androsten-3-one (II), (b) the corresponding N-oxide (V) and (c) 6-methylene - 19-nor-17α-ethynyl-17β-hydroxy-4-androsten-3-one (III).

EXAMPLE 40

Methyl 6-methylene-3,11-dioxo-4,17(20)-pregnadien-21-oate (III)

Following the procedure of Example 35 but substituting methyl 3 - (β-hydroxyethoxy)-3,5,17(20)-pregnatrien-11-oxo-21 oate (I) and ethylbutylamine, yields (a) methyl 6β - ethylbutylaminomethyl 3,11-dioxo-4,17(20)-pregnadien-21-oate (II), (b) the corresponding N-oxide (V) and (c) methyl - 6-methylene-3,11-dioxo-4,17(20)-pregnadien-21-oate (III).

EXAMPLE 41

6-methylene-4-androsten-17-one (III)

Following the procedure of Example 35 but substituting 3 - naphthoxy-3,5-androstadien-17-one (I) and 3-ethylpyrrolidine, yields (a) 6β - (3-ethylpyrrolidinomethyl)-4-androsten-17-one (II), (b) the corresponding N-oxide (V) and (c) 6-methylen-4-androsten-17-one (III).

EXAMPLE 42

6-methylene-17α,21-dihydroxy-4,9(11)-pregnadien-20-one 21-acetate (III)

Following the procedure of Example 35 but substituting 3 - phenoxy - 17α,21-dihydroxy-3,5,9(11)-pregnatrien-20-one 21-acetate (I) and morpholine, yields (a) 6β-morpholinomethyl-17α,21-dihydroxy-4,9(11)-pregnadien-20-one 21-acetate (II), (b) the corresponding N-oxide (V) and (c) 6 - methylene-17α,21-dihydroxy-4,9(11)-pregnadien-20-one 21-acetate (III).

EXAMPLE 43

6-methylene-17β-hydroxy-17α-vinyl-4-androstene 17-propionate (III)

Following the procedure of Example 35 but substituting 3 - propoxy-17β-hydroxy-17α-vinyl-3,5-androstadiene-17-propionate (I) and 2,6-dimethylpiperidine, yields (a) 6β-(2,6-dimethyl piperidinomethyl) - 17β-hydroxy-17α-vinyl-4-androstene 17-propionate (II), (b) the corresponding N-oxide (V) and (c) 6-methylene-17β-hydroxy-17α-vinyl-4-androstene 17-propionate (III).

EXAMPLE 44

6-methylene-17α,21-dihydroxy-4-pregnene-11,20-dione 17,21-diacetate (III)

Following the procedure of Example 35 but substituting 3 - (β - ethoxyethoxy)-17α,21-dihydroxy-3,5-pregnadien-11,20-dione 17,21-diacetate (I) and dimethylamine, yields (a) 6β - dimethylaminomethyl-17α,21-dihydroxy-4-pregnene-11,20-dione 17,21-diacetate (II), (b) the corresponding N-oxide (V) and (c) 6-methylene-17α,21-dihydroxy-4-pregnene-11,20-dione 17,21-diacetate (III).

I claim:
1. A process for the production of a steriod compound having in rings A and B of the steroid nucleus the structure

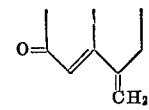

III which comprises the steps of
(1) mixing a corresponding steroid compound having in rings A and B of the steroid nucleus the structure

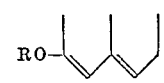

I wherein R is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety its from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, with formaldehyde and a compound of the formula

wherein $R^1$ and $R^2$ are selected from the group consisting of alkyl of from one through twelve carbon atoms and aryl of from six through fourteen carbon atoms, with the proviso that $R^1$ and $R^2$ cannot both be alkyl, to yield a corresponding compound having in rings A and B of the steroid nucleus the structure

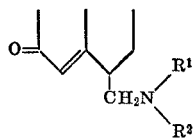   II wherein R¹ and R² have the same meaning as above;
(2) mixing a thus produced corresponding compound resulting from step (1) with a strong acid to yield a corresponding compound of Formula III, above.

2. A process in accordance with claim 1 wherein the compound of Formula III is methyl 6-methylene-3,11-dioxo-4,17(20)-pregnadien-21-oate, the compound of Formula I is methyl 11-oxo-3-methoxy-3,5,17(20)-pregnatrien-21-oate, and the compound of Formula II is methyl 6β-(N-phenyl - N - methylaminomethyl)-3,11-dioxo-4,17(20)-pregnadien-21-oate.

3. A process for the preparation of a steroid compound having in rings A and B of the steroid nucleus the structure

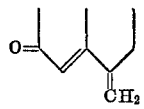   III which comprises mixing with a strong acid a corresponding steroid compound having in rings A and B of the steroid nucleus the structure

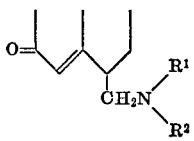   II wherein R¹ and R² are selected from the group consisting of alkyl of from one through twelve carbon atoms and aryl of from six through fourteen carbon atoms, with the proviso that R¹ and R² cannot both be alkyl.

4. A process in accordance with claim 3 wherein the compound of Formula III is methyl 6-methylene-3,11-dioxo-4,17(20)-pregnadien-21-oate and the compound of Formula II is methyl 6β-(N-phenyl-N-methylaminomethyl-3,11-dioxo-4,17(20)-pregnadien-21-oate.

5. A process for the production of a steroid compound having in rings A and B of the steroid nucleus the structure

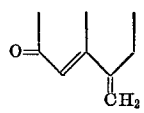   III which comprises the steps of
(1) mixing a corresponding steroid compound having in rings A and B of the steroid nucleus the structure

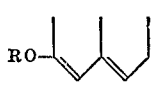   I wherein R is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, with formaldehyde and a compound of the formula

wherein R¹ and R² are alkyl of from one through twelve carbon atoms, and R¹, R² and N when taken together form a secondary cyclic alkylene amino group containing from five through seven carbon atoms, to yield a corresponding compound having in rings A and B of the steroid nucleus the structure

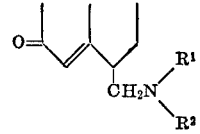   II wherein R¹ and R² each, and both taken together with N, have the same meaning as above;
(2) mixing a thus produced corresponding compound resulting from step (1) with a compound selected from the group consisting of a dialkylsulfate and an alkyl halide to yield a corresponding compound having in rings A and B of the steroid nucleus the structure

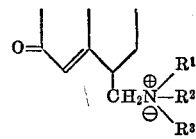   IV wherein R¹, R² and R³ are alkyl of from one through twelve carbon atoms and X⊖ is selected from the group consisting of alkylosulfate and halogen;
(3) mixing a thus produced corresponding compound resulting from step (2) with a base to yield a corresponding compound of Formula III, above.

6. A process in accordance with claim 5 wherein the compound of Formula III is 6-methylene-17α-hydroxy-4-pregnene-3,20-dione, the compound of Formula I is 17α-hydroxy-3-methoxy-3,5-pregnadien-20-one, the compound of Formula II is 6β-piperidinomethyl-17α-hydroxy-4-pregnene-3,20-dione, the compound of Formula IV is the methiodide of the compound of Formula II and the alkyl halide of step (2) is methyl iodide.

7. A process for the production of a steroid compound having in rings A and B of the steroid nucleus the structure

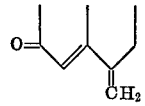   III which comprises the steps of
(1) mixing a corresponding steroid compound having in rings A and B of the steroid nucleus the structure

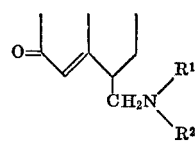   II wherein R¹ and R² are alkyl of from one through twelve carbon atoms, and R¹, R² and N when taken together form a secondary cyclic alkylene amino group containing from five through seven members, with a compound selected from the group consisting of a dialkyl sulfate and an alkyl halide to yield a corresponding compound having in rings A and B of the steroid nucleus the structure

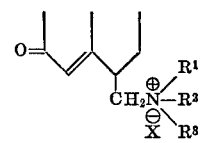   IV wherein R¹, R² and R³ are alkyl of from one through twelve carbon atoms and X⊖ is halogen;

(2) mixing a thus produced corresponding compound resulting from step (1) with a base to yield a corresponding compound of Formula III, above.

8. A process in accordance with claim 7 wherein the compound of Formula III is 6-methylene-17α-hydroxy-4-pregnene-3,20-dione, the compound of Formula II is 6β-piperidinomethyl-17α-hydroxy-4-pregnene-3,20-dione, the compound of Formula IV is the methiodide of the compound of Formula II, and the alkyl halide of step (1) is methyl iodide.

9. A process for the production of a steroid compound having in rings A and B of the steroid nucleus the structure

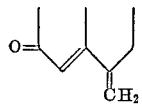   III which comprises mixing with a base a corresponding compound having in rings A and B of the steroid nucleus the structure

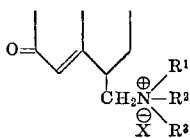   IV wherein $R^1$, $R^2$ and $R^3$ are alkyl of from one through twelve carbon atoms and $X^\ominus$ is selected from the group consisting of an alkylosulfate and a halogen.

10. A process in accordance with claim 9 wherein the compound of Formula III is 6-methylene-17α-hydroxy-4-pregnene-3,20-dione and the compound of Formula IV is the methiodide of 6β-piperidinomethyl-17α-hydroxy-4-pregnene-3,20-dione.

11. A process for the production of a steroid compound having in rings A and B of the steroid nucleus the structure

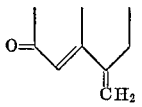   III which comprises the steps of
(1) mixing a corresponding steroid compound having in rings A and B of the steroid nucleus the structure

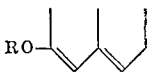   I wherein R is selected from the group consisting of alkyl or from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, with formaldehyde and a compound of the formula

wherein $R^1$ and $R^2$ are alkyl of from one through twelve carbon atoms, and $R^1$, $R^2$ and N when taken together form a secondary cyclic alkylene amino group containing from five through seven carbon atoms, to yield a corresponding compound having in rings A and B of the steroid nucleus the structure

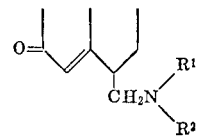   II wherein $R^1$ and $R^2$ each, and both taken together with N, have the same meaning as above;

(2) heating a thus produced corresponding compound resulting from step (1) with a compound selected from the group consisting of an alkyl halide and a dialkyl sulfate to yield a corresponding compound having in rings A and B of the steroid nucleus the structure

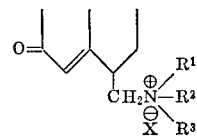   IV wherein $R^1$, $R^2$ and $R^3$ are alkyl of from one through twelve carbon atoms and $X^\ominus$ is selected from the group consisting of halogen and alkylosulfate;

(3) subjecting a thus produced corresponding compound resulting from step (2) to enol etherification at the 3-position of the steroid nucleus to yield a corresponding compound having in rings A and B of the steroid nucleus the structure

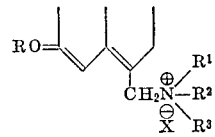   VI wherein R is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and $R^1$, $R^2$, $R^3$ and $X^\ominus$ have the same meaning as above;

(4) mixing a thus produced corresponding compound resulting from step (3) with water to yield a corresponding compound of Formula III, above.

12. A process in accordance with claim 11 wherein the compound of Formula III is 6-methylene-17α-hydroxy-4-pregnene-3,20-dione, the compound of Formula I is 17α-hydroxy-3-methoxy-3,5-pregnadien-20-one, the compound of Formula II is 6β-piperidinomethyl-17α-hydroxy-4-pregnene-3,20-dione, the compound of Formula IV is the methosulfate of the compound of Formula II and the dialkyl sulfate of step (2) is dimethyl sulfate.

13. A process for the production of a steroid compound having in rings A and B of the steroid nucleus the structure

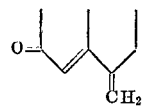   III which comprises the steps of
(1) heating a corresponding steroid compound having in rings A and B of the steroid nucleus the structure

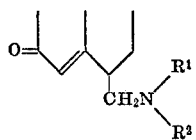
II wherein R¹ and R² are alkyl of from one through twelve carbon atoms, and R¹, R² and N when taken together form a secondary cyclic alkylene amino group containing from five through seven members, with a dialkyl sulfate to yield a corresponding compound having in rings A and B of the steroid nucleus the structure

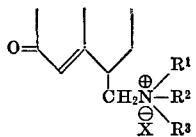
IV wherein R¹, R² and R³ are alkyl of from one through twelve carbon atoms and X⁻ is selected from the group consisting of halogen and alkylosulfate;

(2) subjecting a thus produced corresponding compound resulting from step (1) to enol etherification at the 3-position of the steroid nucleus to yield a corresponding compound having in rings A and B of the steroid nucleus the structure

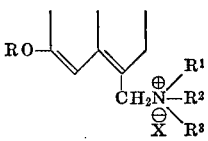
VI wherein R is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and R¹, R², R³ and X⁻ have the same meaning as above;

(3) mixing a thus produced corresponding compound resulting from step (2) with water to yield a corresponding compound of Formula III, above.

14. A process in accordance with claim 13 wherein the compound of Formula III is 6-methylene-17α-hydroxy-4-pregnene-3,20-dione, the compound of Formula II is 6β-piperidinomethyl-17α-hydroxy-4-pregnene-3,20-dione, the compound of Formula IV is the methosulfate of the compound of Formula VI is the methosulfate of 6β-piperidinomethyl - 17α - hydroxy-3-methoxy-3,5-pregnadien-20-one, and the dialkyl sulfate of step (1) is dimethyl sulfate.

15. A process for the production of a steroid compound having in rings A and B of the steroid nucleus the structure

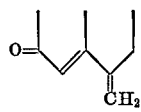
III which comprises the steps of
(1) mixing a corresponding compound having in rings A and B of the steroid nucleus the structure

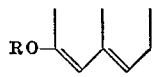
I wherein R is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, with formaldehyde and a compound of the formula

wherein R¹ and R² are alkyl of from one through twelve carbon atoms, and R¹, R² and N when taken together form a secondary cyclic alkylene amino group containing from five through seven carbon atoms, to yield a corresponding compound having in rings A and B of the steroid nucleus the structure

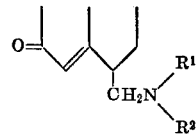
II wherein R¹ and R² each, and both taken together with N, have the same meaning as above;

(2) mixing a thus produced corresponding compound resulting from step (1) with hydrogen peroxide to yield a corresponding compound having in rings A and B of the seroid nucleus the structure

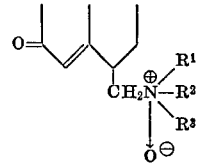
V wherein R¹ and R² each, and both taken together with N, have the same meaning as above;

(3) heating a thus produced corresponding compound resulting from step (2) to yield a corresponding compound of Formula III, above.

16. A process in accordance with claim 15 wherein the compound of Formula III is 6-methylene-17α-hydroxy-4-pregnene-3,20-dione, the compound of Formula I is 17α-hydroxy-3-methoxy-3,5-pregnadien-20-one, the compound of Formula II is 6β-piperidininomethyl-17α-hydroxy-4-pregnene-3,20-dione and the compound of Formula V is the N-oxide of the compound of Formula II.

17. A process for the production of steroid compound having in rings A and B of the steroid nucleus the structure

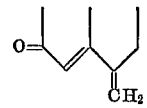
III which comprises the steps of
(1) mixing a corresponding steroid compound having in rings A and B of the steroid nucleus the structure

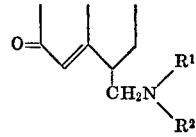
II wherein R¹ and R² are alkyl of from one through twelve carbon atoms, and R¹, R² and N when taken together form a secondary cyclic alkylene amino group containing from five through seven carbon atoms, with hydrogen peroxide to yield a corresponding compound having in rings A and B of the steroid nucleus the structure

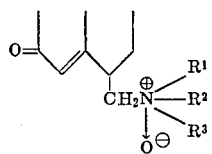   V wherein $R^1$, $R^2$ and $R^3$ are alkyl of from one through twelve carbon atoms;

(2) heating a thus produced corresponding compound resulting from step (1) to yield a corresponding compound of Formula III, above.

18. A process in accordance with claim 17 wherein the compound of Formula III is 6-methylene-17α-hydroxy-4-pregnene-3,20-dione, the compound of Formula II is 6β-piperidinomethyl-17α-hydroxy-4-pregnene-3,20-dione and the compound of Formula V is the N-oxide of the compound of Formula II.

19. A process for the production of a steroid compound having in rings A and B of the steroid nucleus the structure

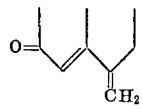   III which comprises heating a corresponding steroid compound having in rings A and B of the steroid nucleus the structure

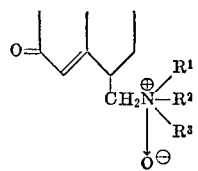   V wherein $R^1$, $R^2$ and $R^3$ are alkyl of from one through twelve carbon atoms.

20. A process in accordance with claim 19 wherein the compound of Formula III is 6-methylene-17α-hydroxy-4-pregnene-3,20-dione and the compound of Formula V is the N-oxide of 6β-piperidinomethyl-17α-hydroxy-4-pregnene-3,20-dione.

References Cited
UNITED STATES PATENTS 3,159,643   12/1964   Kirk et al. _____ 260—397.3

HENRY A. FRENCH, Primary Examiner

U.S. Cl. X.R.

260—239.55 R, 239.55 A, 239.55 D, 239.57, 397.2, 397.3, 397.4, 397.45, 397.47